(12) United States Patent
Fima et al.

(10) Patent No.: US 6,769,493 B1
(45) Date of Patent: Aug. 3, 2004

(54) LIQUID DISPENSING LIGHTER-THAN-AIR AIRSHIP SYSTEM

(75) Inventors: Raoul G. Fima, Oceanside, CA (US); Thomas Gagliano, Huntington Beach, CA (US); Ralph E. Pope, Cumming, GA (US)

(73) Assignee: Wetzone Technologies, LLC, Oceanside, CA (US)

( * ) Notice: Subject to any disclaimer, the term of this patent is extended or adjusted under 35 U.S.C. 154(b) by 0 days.

(21) Appl. No.: 10/321,016

(22) Filed: Dec. 18, 2002

Related U.S. Application Data (63) Continuation-in-part of application No. 09/796,973, filed on Mar. 2, 2001, now abandoned.

(51) Int. Cl.[7] .............................................. A62C 25/00
(52) U.S. Cl. ........................... 169/53; 169/51; 239/171; 239/548; 244/136
(58) Field of Search .............................. 169/53, 46, 51; 239/14.1, 722, 723, 725, 726, 548, 550, 171; 244/136, 125, 115, 30, 31, 129.2

(56) References Cited

U.S. PATENT DOCUMENTS

| | | |
|---|---|---|
| 1,609,762 A | 12/1926 | Morgan |
| 3,710,868 A | 1/1973 | Chadwick |
| 3,753,539 A * | 8/1973 | Moore .......................... 244/128 |
| 3,828,857 A | 8/1974 | Mason |
| 3,897,829 A | 8/1975 | Eason |
| 4,009,850 A | 3/1977 | Hickey |
| 4,052,025 A | 10/1977 | Clark et al. |
| 4,149,688 A | 4/1979 | Miller, Jr. |
| 4,344,489 A | 8/1982 | Bonaparte |
| 4,421,204 A * | 12/1983 | Lawrence ..................... 344/31 |
| 4,591,112 A | 5/1986 | Piasecki et al. |
| 4,936,389 A | 6/1990 | MacDonald et al. |
| 4,979,571 A | 12/1990 | MacDonald |
| 5,135,055 A * | 8/1992 | Bisson ......................... 169/53 |
| 5,295,625 A * | 3/1994 | Redford ...................... 239/14.1 |
| 5,590,717 A | 1/1997 | McBay et al. |
| 5,823,468 A | 10/1998 | Bothe |

* cited by examiner

*Primary Examiner*—Dinh Q. Nguyen
(74) *Attorney, Agent, or Firm*—William B. Noll (57) ABSTRACT

A lighter-than-air airship system, having a multitude of uses, with a primary purpose being the dispensing of water over a raging fire, where access by personnel and ground equipment is difficult. The airship system comprises an aerodynamically configured structure having a semi-rigid keel or skeleton, where lift is provided in part by helium, with the keel mounting a liquid management mechanism preferably consisting of a reservoir open to the outside for resupply of liquid or water, a conduit leading to a holding tank, and a piping distribution and nozzle assembly below the airship system to spray or dispense the liquid or water, like an artificial rain, over selected areas to control or extinguish the raging fire. Alternate systems are provided for replenishing or filling the holding tank from ground locations.

11 Claims, 12 Drawing Sheets

LIQUID DISPENSING LIGHTER-THAN-AIR AIRSHIP SYSTEM

RELATED APPLICATION

This application is a Continuation-In-Part of Ser. No. 09/796,973, filed Mar. 3, 2001, now abandoned, under the title, LIGHTER-THAN-AIR WATER DISPENSING AIRSHIP FOR FIRE CONTROL, by the inventors hereof, where the contents thereof are incorporated herein in their entirety.

FIELD OF THE INVENTION

This invention is directed to the field of semi-rigid or hybrid, lighter-than-air airships, of the kind that can deliver and disperse quantities of a liquid, such as water or other fire suppressant materials to forest fires, for example, rain of water to a draught area or other disaster area.

BACKGROUND OF THE INVENTION

The present invention relates to a lighter-than-air, airship, or rapid deployment hybrid platform system that offers particular utility as a fire control vehicle to dispense large quantities of water, i.e. man made rain, or other fire suppressant materials over out-of-control fire areas. However, the system hereof is sufficiently versatile to use over other types of disaster areas. Notwithstanding the broad uses available to the system, the further description will be directed to its use in fighting forest fires. As has become all to common for many areas of the world, vast and furious forest fires are an unfortunate fact of life for many people, especially in the western states of the United States.

Forest fires are presently controlled by ground personnel using backfires and fire breaks, and by air drops of fire-fighting materials from helicopters and fixed wing airplanes. These methods put large numbers of personnel at risk and the payloads of fire-fighting aircraft are very small. The air drops are high impact, which are a danger to ground personnel and particularly inefficient because they are so concentrated. They are the equivalent of dropping a pail of water on a stadium fire.

A number of the different airborne types of fire fighting apparatus are illustrated and described in the following U.S. Patents:

a.) U.S. Pat. No. 3,710,868, to Chadwick, teaches a bucket, for suspension from the cargo hook of a helicopter, where the bucket is provided with a plurality of valves and valve actuating means presenting a low profile and compact construction. The valve actuating means depend from arms extending inwardly from the bucket sides.

b.) U.S. Pat. No. 3,828,857, to Mason, relates to a container which may be filled by immersing the lower portion thereof into a fluid and allowing the fluid to enter the container through a main valve and a number of one-way secondary valves in this lower portion. The main valve is connected to a float which closes the valve when a predetermined level of fluid has entered the container. The secondary valves are closed by the action of the fluid when the container is raised from the reservoir of fluid. The main valve is held closed by a latch mechanism which may be tripped from a remote station allowing the valve to open and discharge the fluid from the container.

c.) U.S. Pat. No. 3,897,829, to Eason, describes an airborne fire suppression unit adaptable for installation on an aircraft, particularly, a helicopter, for fighting fires in locations inaccessible to other types of fire fighting equipment. The fire suppression unit comprises a fluid reservoir tank mountable on the floor within the aircraft body, a boom assembly having a nozzle mounted thereon adaptable for coupling with the reservoir tank and a motor-driven pump for directing fluid under pressure from the tank to the nozzle, all adapted for rapid detachable mounting to the aircraft. The boom assembly is mountable so as to extend the nozzle laterally from the aircraft, and is rotatably connected at its mounting point so as to reciprocate laterally with respect to the aircraft. The nozzle is pivotally secured to the extended end of the bottom to reciprocate in a substantially vertical plane. Manually powered control means, operable from within the aircraft to regulate the position of the boom assembly and nozzle, respectively, are provided. A suction conduit coupled with the pump inlet port and adaptable to extend from the helicopter into a body of fluid is provided to permit rapid refilling of the reservoir tank while a fire is in progress. Selectable valve means coupling the pump with the nozzle, tank and suction conduit, respectively, permit the pump to direct fluid either from the tank to the nozzle for fire-fighting purposes, or from the suction conduit to the tank for refilling purposes, or alternatively recirculate the fluid through the tank when neither the nozzle nor suction conduit are being utilized.

d.) U.S. Pat. No. 4,344,489, to Bonaparte, is directed to a forest fire extinguishing device comprising a projectile filled with an inert gas under pressure which is dropped into a fire and automatically disperses the gas. When the device impacts the ground, a plurality of ports are simultaneously opened, allowing the fire extinguishing material to be expelled over a prescribed area.

e.) U.S. Pat. No. 4,936,389, to MacDonald et al., teaches a fluid dispensing system for an aircraft. The system, between the open and closed positions, includes a bottom door panel controlling release of fluid from an airborne container containing the fluid, and is governed by both the height of the fluid in the container and the instantaneous position of the door panel.

f.) U.S. Pat. No. 4,979,571, to MacDonald, relates to an apparatus for producing a delayed foaming action in mixed liquids useful as suppressants for fire area control and curtailment of chemical spills. The apparatus is self-powered and sized to be transported to a target area by a variety of land and sea vehicles as delivery platforms. The apparatus is particularly designed for airborne delivery and is especially adaptable to helicopter applications.

g.) U.S. Pat. No. 5,590,717, to McBay et al., describes a fire extinguishing capsule for the cooling and quenching of destructive fires. The fire extinguishing capsule comprises two double-walled hemishapes which are sealed together by an equatorial belt seal which may be ruptured in order to disperse the extinguishing in the capsule. The capsule may be suspended from a hook and ladder system, for example, a helicopter in the case of forest fires, oil well fires, or transported by sled to a fire scene.

h.) U.S. Pat. No. 4,009,850, to Hickey, covers airships for transporting liquid that includes storage tanks located midship with their inlet conduits opening through the forward part of an upper deck enabling the tanks to be filled while the airship is moored to a special tower. The tank contents are discharged through outlet conduits that are lowered to the receiver station. Where different liquids are to be carried, the tanks are arranged to minimize ballasting problems during loading and unloading.

i.) U.S. Pat. No. 1,609,762, to Morgan, relates to a system for extinguishing fires that includes the combination of a dirigible balloon and a water tank supported by the balloon and transported therewith. The water tank includes means whereby it may be filled either through a pump operated by a motor, or by dipping into a vessel of water and allowing the tanks to fill as the system travels forward.

It is clear from the foregoing prior art that the preferred modes of fighting fires from aircraft type systems are limited to helicopters and fixed wing airplanes, all of which are heavier-than-air. Though the latter two patents teach the use of a dirigible type system, the present invention represents a dramatic departure from the traditional modes by the use of hybrid platform aircraft systems that are known for their many flying characteristics, such as vertical take off and landing (VTOL), and/or running vertical take off and landing (R-VTOL), and/or super take off as landing (S-STOL) capabilities, derived through their unique shape and design, and thus their different lift principles. U.S. Pat. No. 5,823,468to Bothe, illustrates a recent development in the area of hybrid aircraft. Heretofore, one problem related to LTA was the lack of speed and its inherent limitations. Hybrid aircraft systems were thus developed to overcome this speed deficiency, as discussed in U.S. Pat. No. 4,591,112, et al. Further efforts to improve the performance of hybrid airships resulted in the design of partially buoyant airships which derive some limited lift from their hull shape, see U.S. Pat. No. 4,052,025, to Clark et al. Still another effort in this area is taught in U.S. Pat. No. 4,149,688, to Miller, Jr.

Returning to the development by Bothe, the patentee teaches a hybrid aircraft that is intended for passenger and cargo use. The system thereof has VTOL, R-VTOL and S-STOL capabilities. The aircraft has lifting body hull and four wing sections arranged in tandem which are pivotally moveable about their neutral axis. Each wing section has mounted thereon a pivotal propeller-rotor assembly for providing thrust substantially in a range between horizontal and vertical. The wings and propellers are integrated to the hull by an outrigger designed to be very stiff and to distribute forces from the wings and propellers to the hull. The hull is shaped to provide aerodynamic lift in an airstream and to facilitate construction by minimizing the number of panels of differing curvature required. As an alternative, the patent teaches that plural high speed fans may be used in place of the propeller-rotors. Though the latter group of patents describe details of a hybrid aircraft, where such details are incorporated herein by reference, they fail to teach a hybrid system having the means for the continuous 24 hour supply of fire suppressing material, such as water, to virtually provide for a man made or artificial rain over the raging fire, particularly in remote areas where ground vehicles cannot reach the fire scene. The manner by which the present invention these goals to fruition will become more apparent in the description which follows, especially when read in conjunction with the accompanying drawings.

SUMMARY OF THE INVENTION

This invention relates to a [lighter-than-air] hybrid airship, platform system for dispensing large quantities of liquid in flight and hovering modes, preferably a rapidly deployment hybrid platform system that is shaped to provide aerodynamic lift in an air stream, and has particular utility for fire control of fires where ground personnel may be in danger, or where access by vehicles may be limited. The system hereof also has utility in providing drought or fire control for both man made and natural disasters. Further, It should be noted that the system hereof has applicable uses other than fire control, such as fertilizing large fields, insect spraying along coastal or swampy regions, irrigation, air quality measurement and monitoring, and aerial seeding and reforestation. Notwithstanding the above, fire control remains the primary application of the system, hence the further description will be so limited for convenience and understanding.

The system of the invention comprises a hybrid airship, platform system formed of a semi-rigid keel or skeleton within which helium is contained as one of the lifting forces for the airship, where the balance of lift is achieved by its shape which provides aerodynamic lift in an air stream. Externally, the airship features a pilot cabin, plural engines fans, and stabilizing means for controlling the steering and hovering of the airship. In the preferred embodiment, the airship system includes at least a single liquid storage and related distribution mechanism, including an externally accessible reservoir for resupplying or replenishing the liquid, such as water, for eventually distribution over the fire area. The liquid storage and distribution mechanism includes at least a first storage tank it communication with the externally accessible reservoir, and a liquid distribution manifold extending from the storage tank(s) to below the airship. The manifold may consist of plural distribution arms featuring arrays of nozzles or cannon that may be selectively operated for the desired distribution pattern. To protect and insure the efficiency of the system hereof, various filters are incorporated into the mechanism to separate unwanted debris that may enter the liquid supply.

Accordingly, a feature of this invention is to provide a lighter-than-air airship system that includes a large liquid payload capacity to develop and maintain a man made or artificial rainfall over selected areas of need, such as a forest fire.

Another feature hereof is the provision of a means to provide refilling of the liquid payload while the airship system remains continuously in flight, thus providing an endless supply of liquid, i.e. water to a selected fire area.

A further feature of the invention is a means to alternately fill the payload when the airship system is either tethered to the ground, or hovering or moving above a water supply, i.e. lake or pond, such that upon release the system will be immediately available for its intended activity.

These and other features of the invention will become more apparent from the specification and drawings which follow.

BRIEF DESCRIPTION OF DRAWINGS

FIG. 13 is a side view of an alternate embodiment of the lighter-than-air vehicle of FIG. 1, modified with a lower mounted pilot's cabin and a water scoop arrangement for picking up water from a body of water while the vehicle is in an essentially moving or hovering mode over the body of water.

DETAILED DESCRIPTION OF PREFERRED EMBODIMENT

The present invention is directed to a lighter-than-air airship system, preferably a rapid deployment hybrid platform system, having the primary application as a vehicle for controlling and extinguishing fires, such as a forest fire. By use of the term hybrid, the invention preferably covers an airship that utilizes both hydro dynamics and hydro static aspects of a flying aircraft to achieve its lift and mobility while in a flight and hovering mode. A hydro dynamic system is typical of a fixed wing aircraft, whereas a hydro static system is typical of a conventional blimp where lift is solely achieved through helium, a lighter-than-air gas. The airship system, with its details and variations will now be described with regard to the accompanying fifteen Figures, where like reference numerals represent like components or features throughout the various views.

Figure 1:
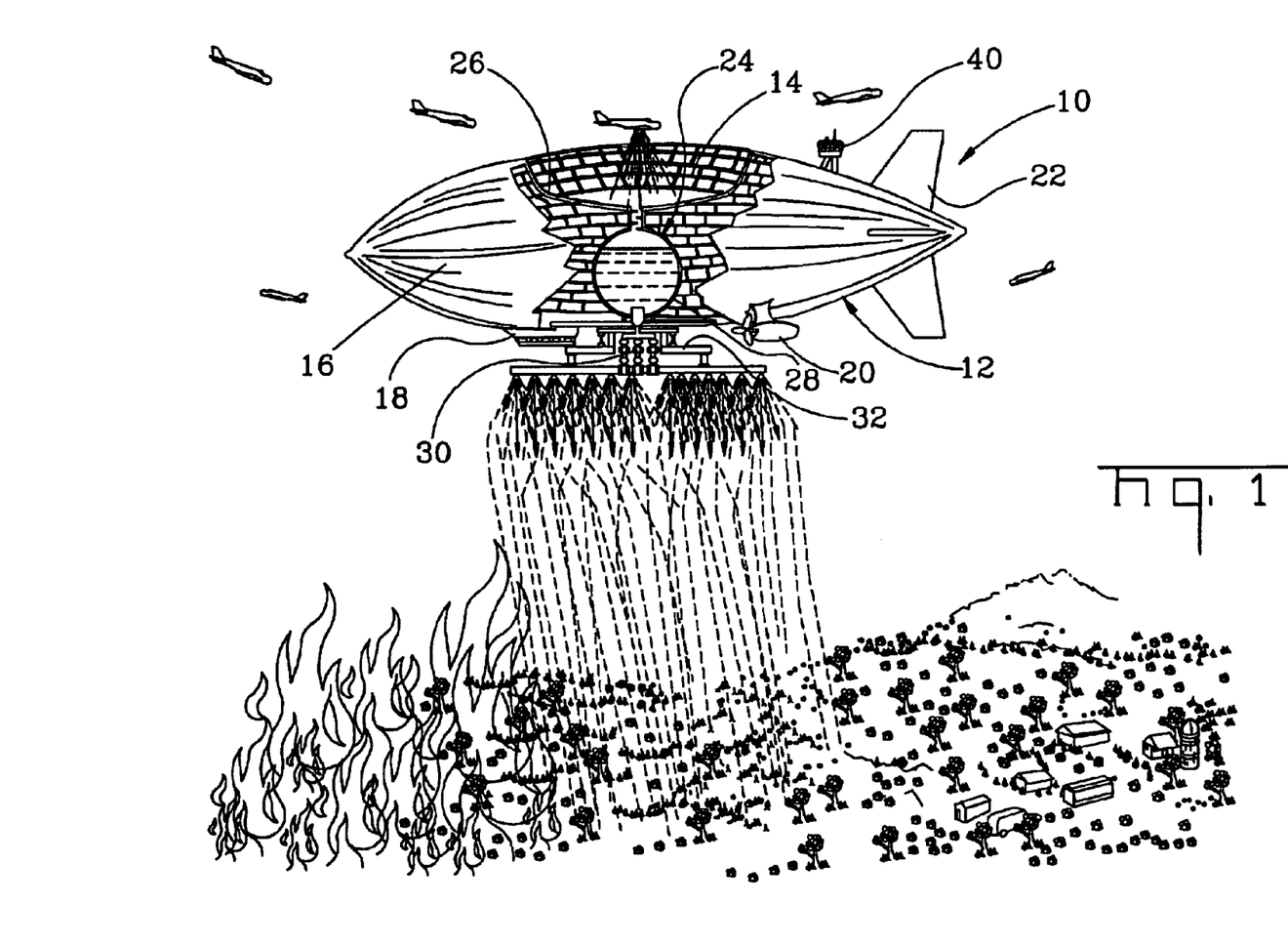
FIG. 1 is a side view, with portions removed to reveal certain internal details, illustrating the operating system for the lighter-than-air vehicle of this invention, as it may be employed to suppress a raging fire.

Turning now to the several Figures, FIG. 1 illustrates the preferred airship system 10 in an operating mode, i.e. applying water and/or fire suppressant to a raging fire on the ground. The airship system 10, which may termed a hybrid aircraft, i.e. a VSTOL lift aircraft that can hover like a helicopter, comprises a lighter-than-air vehicle 12 aerodynamically shaped to provide lift in an airstream, and to fly and hover over the ground. The vehicle includes a semi-rigid keel or skeleton 14 encased in a flexible skin 16, within which are closed modules or volumes containing helium, a non-combustible lighter-than-air gas, as known in the art, where helium provides the primary lift for said system. The airship system 10, to facilitate flying and hovering, further includes a pilot's cabin 18 for the flying personnel on the top to visually observe the replenishing of liquid, or below, as desired. Additionally, the airship system 10 incorporates a plurality of engines 20 having high speed fans, preferably four or more, and a tail stabilizing assembly 22, all of which are known in the art, to provide 3-axis stability and control. Pitch stability control of the airship system is maintained by weight transfers systems and ballasting where payload and ballast weight can be exchanged, practices known in the art.

Figure 2:
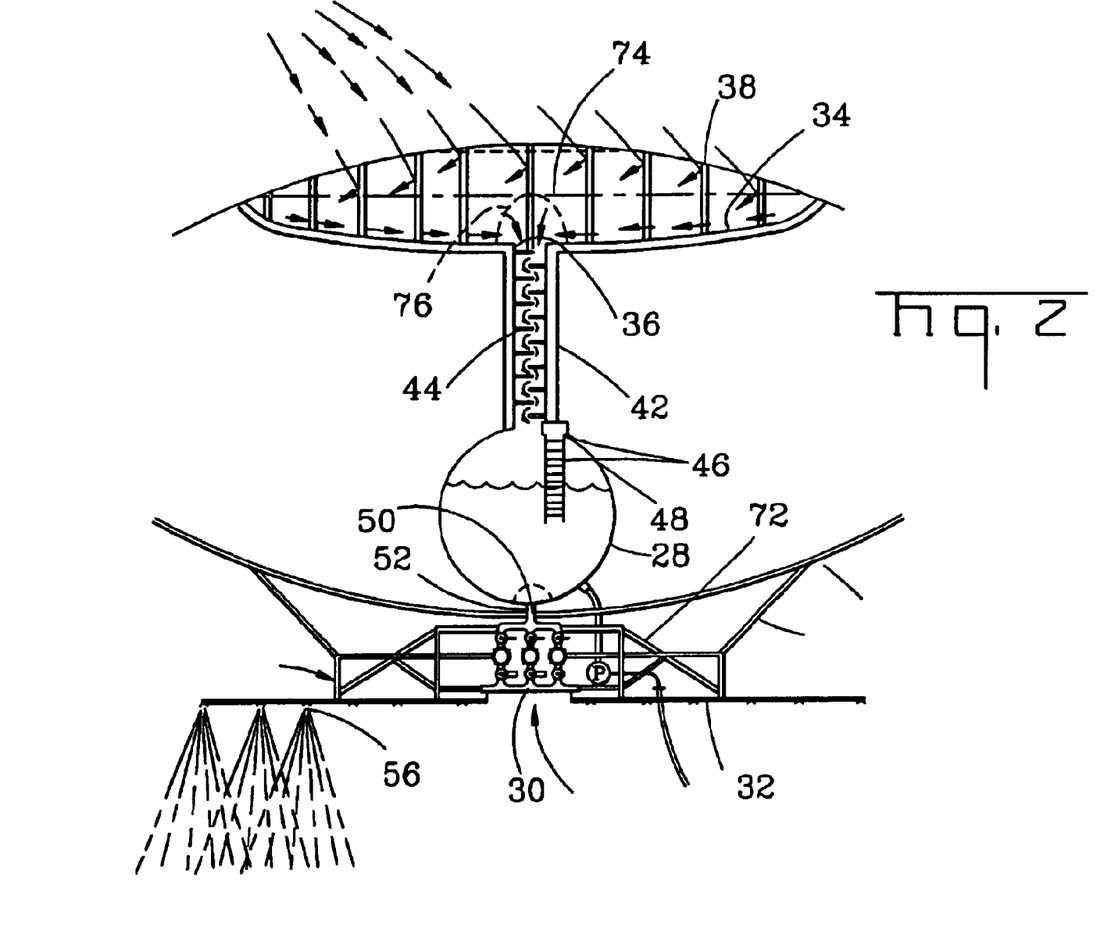
FIG. 2 is an enlarged, partial sectional view of the lighter-than-air vehicle of FIG. 1, showing the water receiving reservoir in communication with a water tank and water distribution mechanism.
Figure 4:
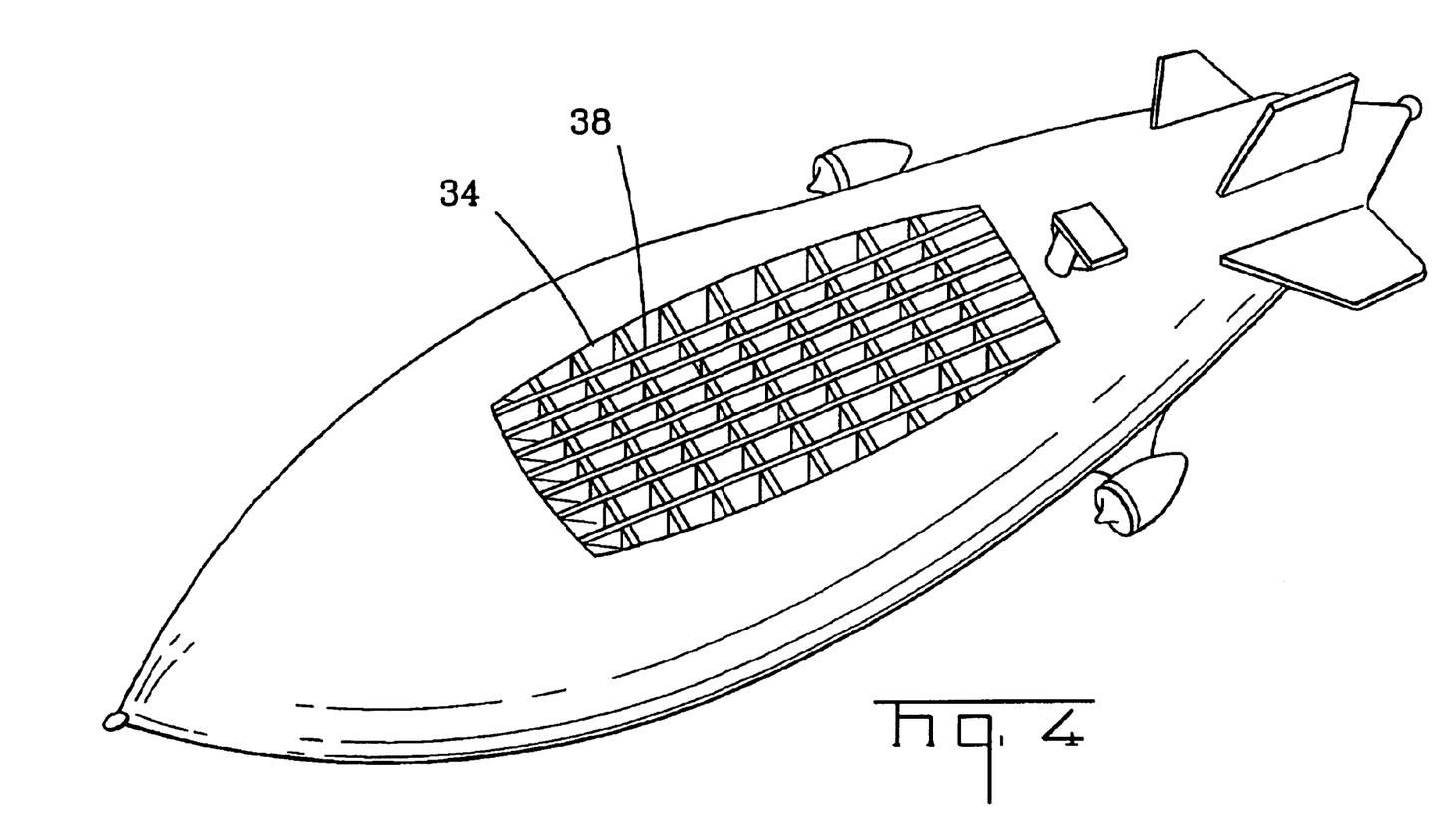
FIG. 4 is a top perspective view of the lighter-than-air vehicle of FIG. 1 showing one embodiment for the open water receiving reservoir forming part of the water distribution mechanism of this invention.

Disposed essentially internally of the airship system 10 is a liquid management mechanism 24 comprising a reservoir 26 or catch basin having a sheet surface stabilized by energy absorbing webs, holding tank 28 which may include plural chambers for separately containing different liquids, such as water and a fire suppressant, a manifold 30, and distribution piping and nozzles 32, or alternately cannons. As further seen in FIGS. 2 and 4, the reservoir or catch basin is an internal recess 34 having a central drain 36 with a surface grate 38. It will be appreciated, as best illustrated in FIG. 1, that as a tanker type airplane deposits water, for example, in large quantities, it is important that means be provided to disperse the kinetic energy of the incoming airdrops and damp the incoming air-dropped delivery dynamics of the incoming water. That is a major function of the surface grate 38 or flexible baffles, and the inflexible base of the reservoir, preferably formed of aluminum or carbon fiber. To control the resupplying traffic above the airship system 10 hereof, an air control tower 40, extending above the airship system, toward the rear thereof, or the control tower or pilot house (see FIG. 13) may be below in camera communication with the liquid replenishing process, may be provided.

Extending from the central drain 36 is a conduit 42 containing a series of alternating, opposing baffle elements 44 down to the holding tank 28 to absorb kinetic energy from the descending water. The holding tank 28, preferably fabricated of a light weight material such as aluminum or carbon fiber, disposed essentially along the center of gravity of the airship system 10, is the direct source for the liquid, i.e. water, to be distributed through the manifold 30 and eventually through the distribution piping and nozzle assembly 32. Since the airship system hereof may be quite large, on the order of 300 yards in length, the holding tank 28 can have a large capacity. For airship systems of this size, the holding tank 28 may include an access door 46 with a ladder 48 to allow for personnel to enter the holding tank for cleaning and inspection. A feature of the holding tank 28 is a lower drain opening 50 and conduit 52 which leads to the distribution piping and nozzle assembly 32. Finally, it will be noted that the holding tank 28 is spherical in configuration and positioned at the center of gravity of the airship system. By this arrangement, irrespective of the level of liquid therewithin, though assisting in ballasting the airship system, more importantly the shape of holding tank 28 maintains the proper gravity balance, or center of gravity for flying and hovering of the airship system. That is, the shape of the holding tank 28 and the aerodynamic lift generating characteristic of the airship's flight is suited to match the liquid payload at any given time of operation.

Figure 3:
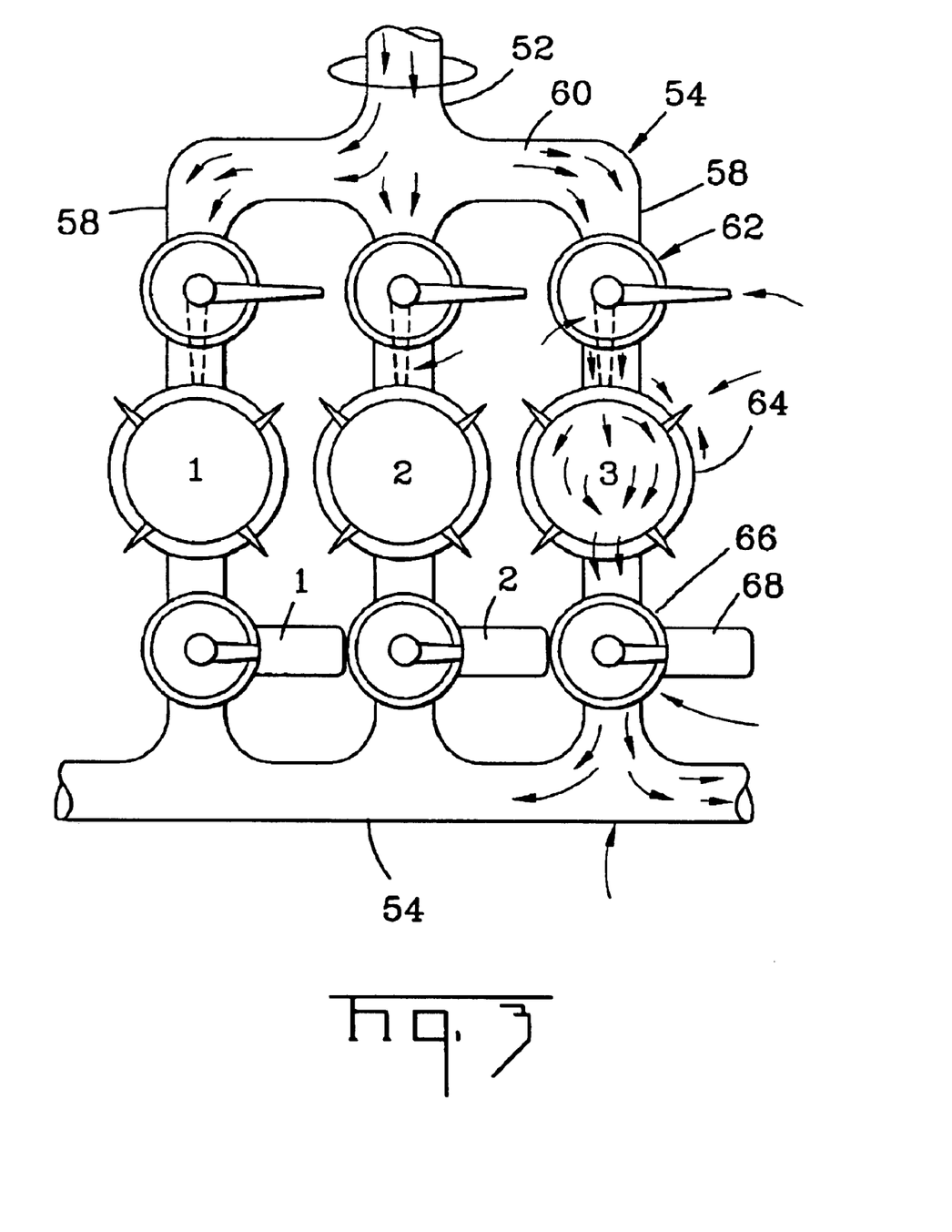
FIG. 3 is an enlarged side view of a water manifold for the water distribution mechanism.

The distribution piping and nozzle assembly 32 includes a manifold 54, see FIG. 3, connected directly to the conduit 52. Though not illustrated, as an alternative, the conduit 52 may include a remotely operated control valve to control the water feed through the distribution piping line 54, such as rectilinear or radial form, to the nozzles 56, which may include water pressure driven rotating or sweeping irrigation nozzles, spiral feeders or side ejection nozzles, all of which are known in the art. The manifold 54, in a preferred embodiment, comprises plural, parallel segments 58 leading from a feeding line 60, which in turn is in communication with conduit 52. The respective segments 58 terminate to a single distribution piping line 54. However, each said segment 58 may include a manual ball valve 62 (closed position shown in FIG. 3, with opened position shown in dotted lines), an intermediate removable filter screen 64 for cleaning, and finally an electronically controlled ball valve 66 with motor 68 for controlled water distribution. Extending from the single or plural distribution piping line 54 are plural nozzles 56, the design of which are well known in the art. To provide structural stability to the distribution piping and nozzle assembly 32, a network support 72 may be included by suspending same from the belly of the airship.

Figure 5:
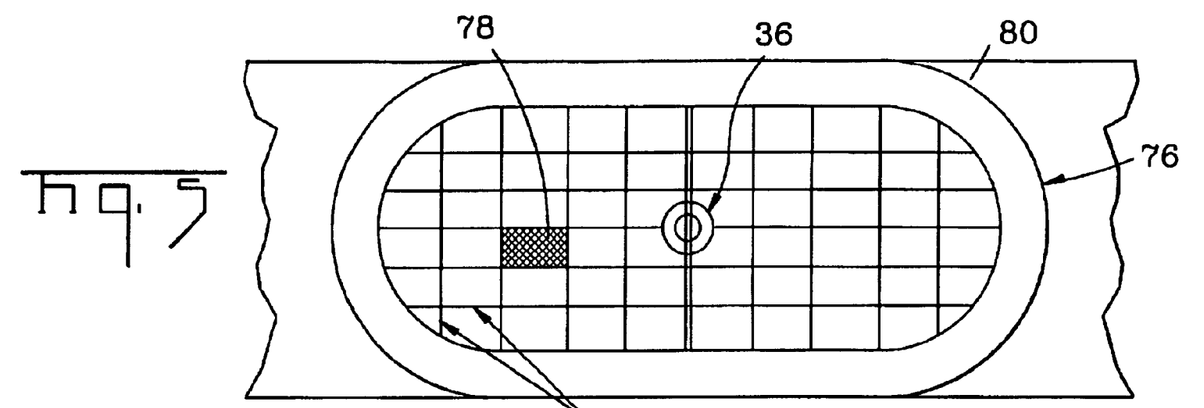
FIG. 5 is an enlarged, partial plan view for a filtering screen between the water receiving reservoir and the water tank hereof.
Figure 6:
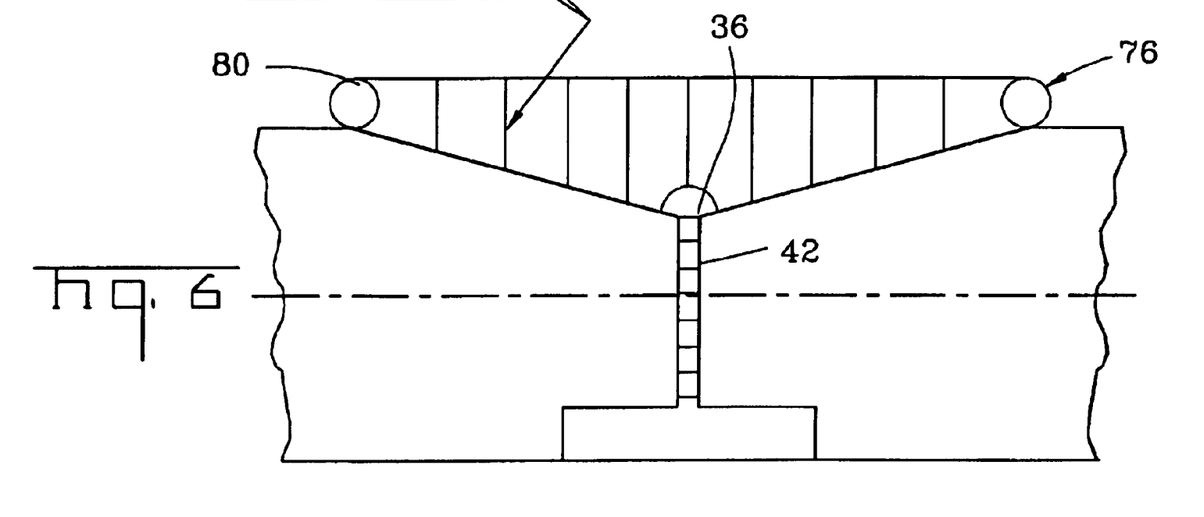
FIG. 6 is an enlarged, partial side view of the filtering screen of FIG. 5.

It will be appreciated that when the refilling vehicles, i.e. airplanes and helicopters, quickly fill its tanks with water, such as from a river or lake, where it is likely that some debris, fish or flow restricting contaminants may enter into the tanks. Accordingly, a series of filters and screens, from coarse to fine, may be provided to protect the liquid management mechanism 24 and to ensure its free flowing operation. The reservoir 26 may includes a "Kevlar", a trademark, screen 74 spaced above the central drain 36, where a second purpose of the screen 74 is to withstand, in part, the impact of the entering water deposited by aircraft, see FIG. 1. At the central drain a further screen 76 may be provided, where FIGS. 5 and 6 illustrate two views of the latter screen. The screen 76 includes a screen lattice 78 surrounded by a slosh wall 80 to help control and direct the water to the conduit 42 and holding tank 28. If a plural chambered holding tank is used, a first said chambered holding tank would be in communication with the conduit 42, while the second would be closed from the conduit.

Figures 7, 8:
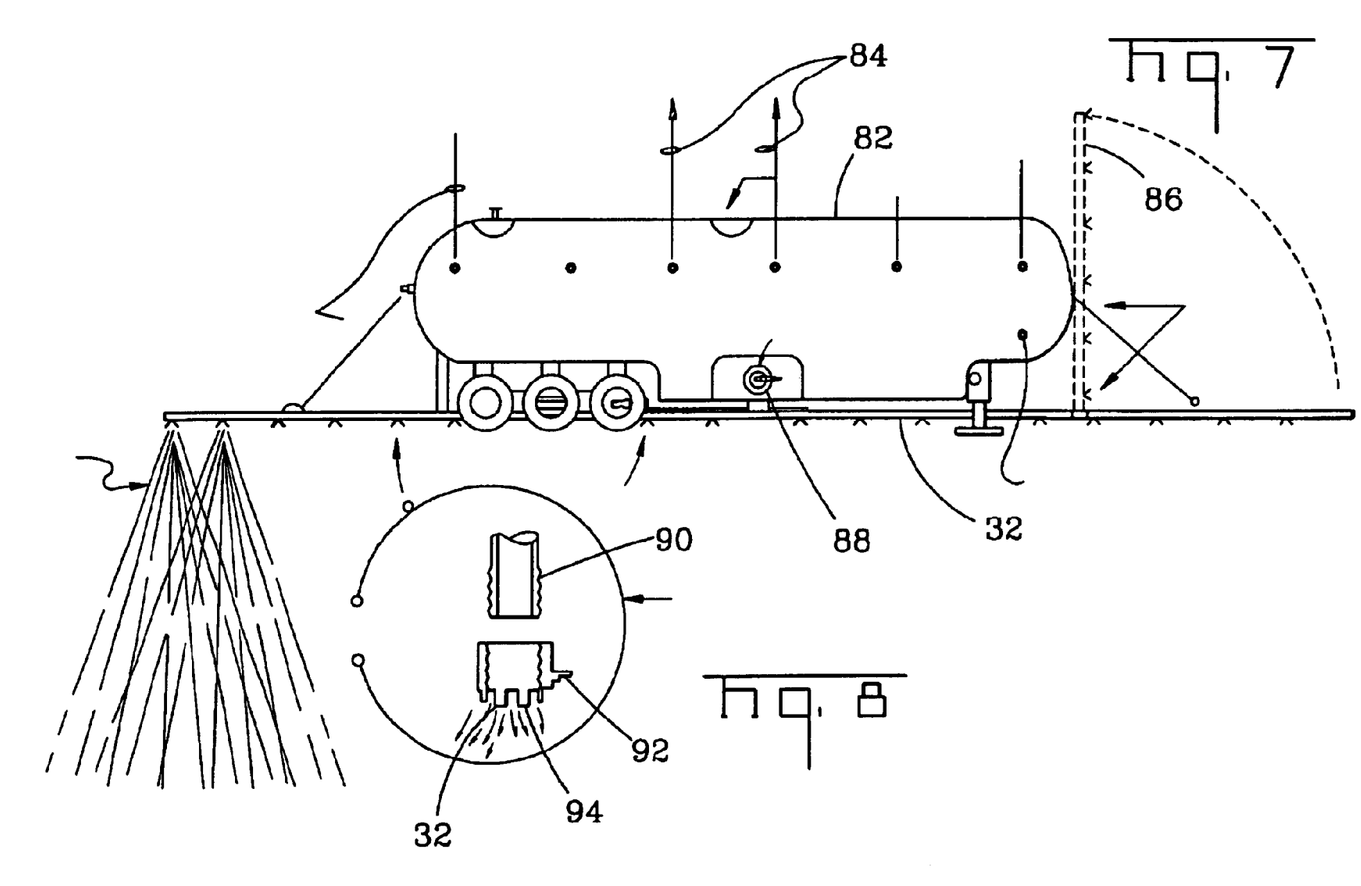
FIG. 7 is a side view of an alternate water reservoir system in the form of a portable tank that may be lifted into the lighter-than-air vehicle, where replenishing of the water supply may not be an easy task.
FIG. 8 is an enlarged, exploded side view of a water distribution nozzle for the portable tank of FIG. 7.

FIGS. 7 through 14 illustrate several alternative embodiments or features for the airship system, or uses for the airship system of this invention. FIG. 7 shows a road transporting tanker 82, as known in the art, that may be temporarily secured within a cavity of the airship body, or suspended by cables 84 from the airship body. To facilitate loading and securing the tanker 82 to the airship body, a hinged ramp 86 may be provided. Dispensing means 88, connecting the tanker 82 to the piping and nozzle assembly 32, is provided. To provide a desired spray to the respective nozzles, a pair of intermatable nozzle heads 90, 92 may be incorporated into the system. Specifically, such nozzle may comprise a male nozzle head 90 to be connected to a female nozzle head 92, where the opening 94 includes a spray dispersing arms 96, see FIG. 8.

Figure 9:
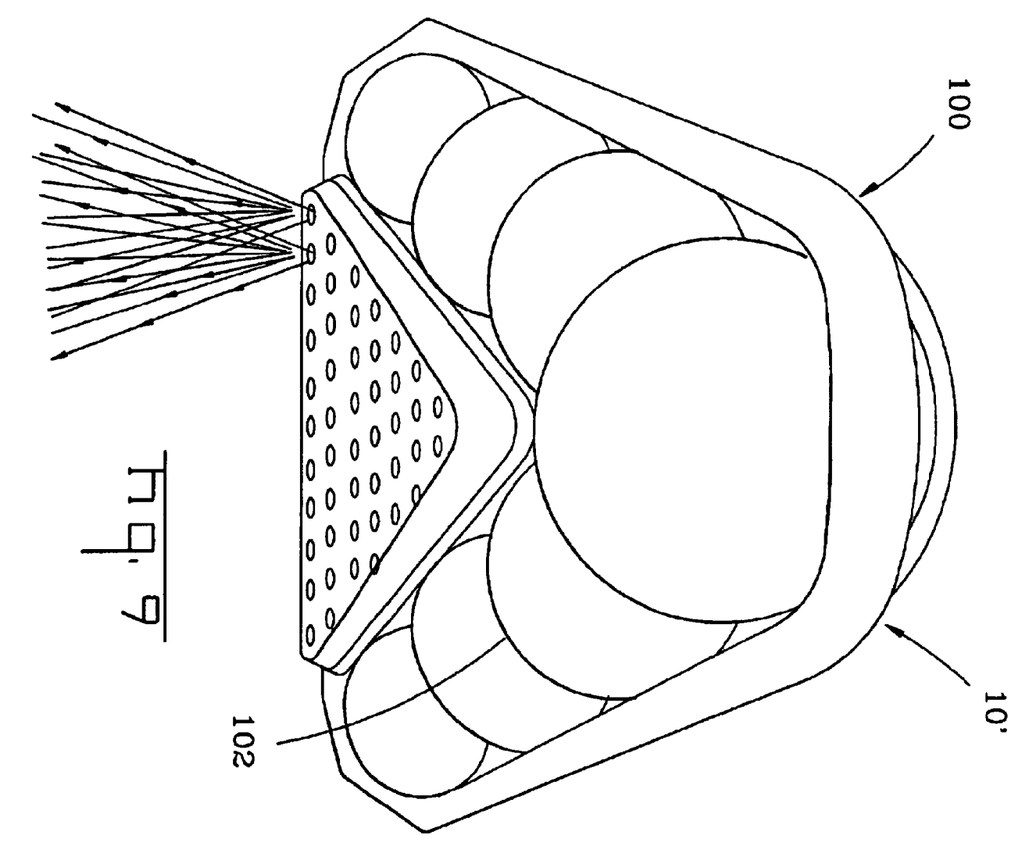
FIG. 9 is a perspective view of an alternate design for the lighter-than-air vehicle of this invention.
Figure 10:
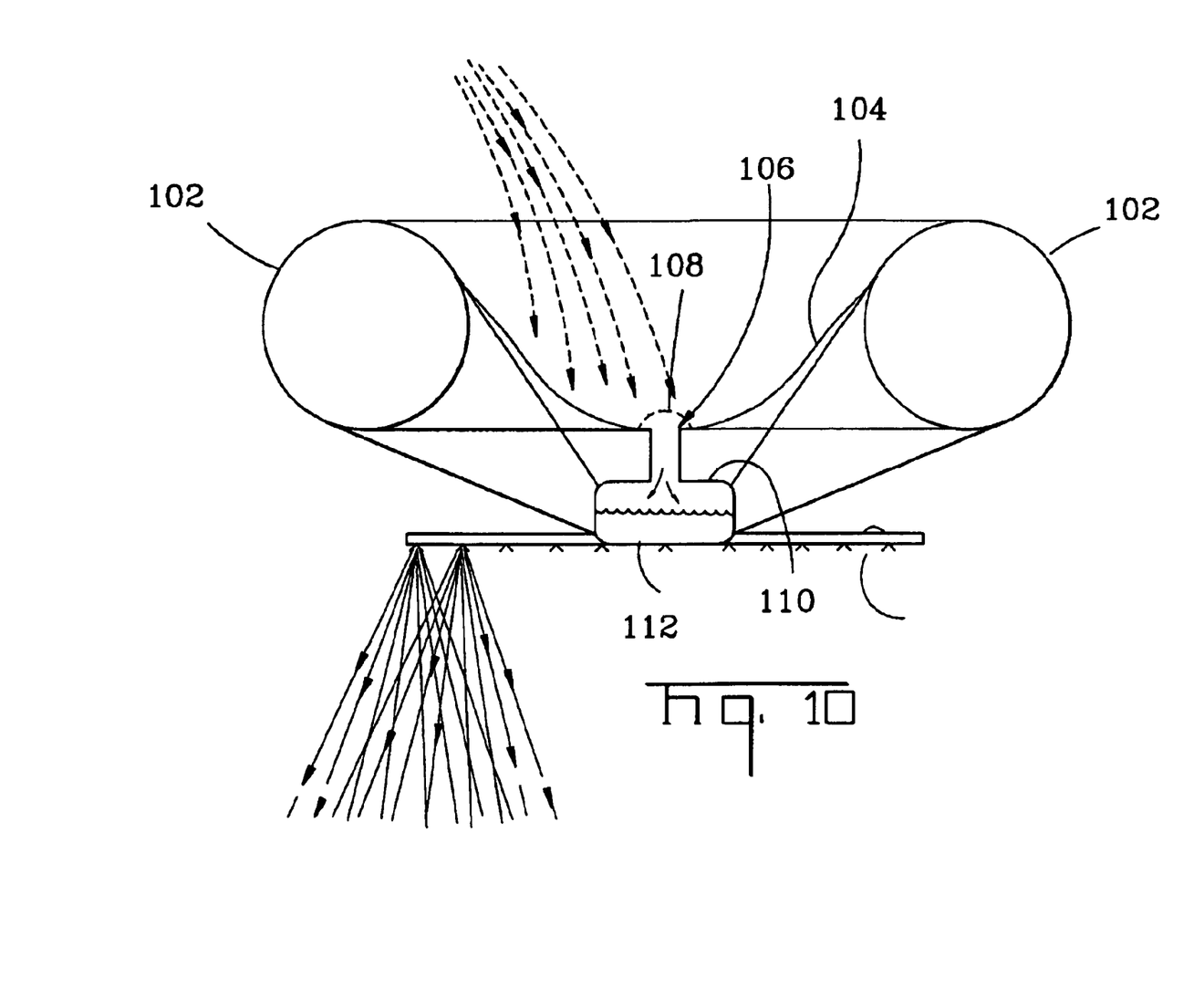
FIG. 10 is a partial, sectional view for alternate design of FIG. 9.

FIGS. 9 and 10 represent an alternate embodiment for the airship system 10' according to this invention. The modified embodiment comprises a semi rigid encircling frame 100 within which are mounted plural helium containing volumes 102. Within the array of helium volumes is a contained recess 104, including a central drain 106 and filter screen 108, for collecting water deposited from flying aircraft, where the central drain is in communication with a liquid holding tank 110. The liquid holding tank, in turn, is in communication with a liquid dispensing plenum 112, see FIG. 9.

Figure 11:
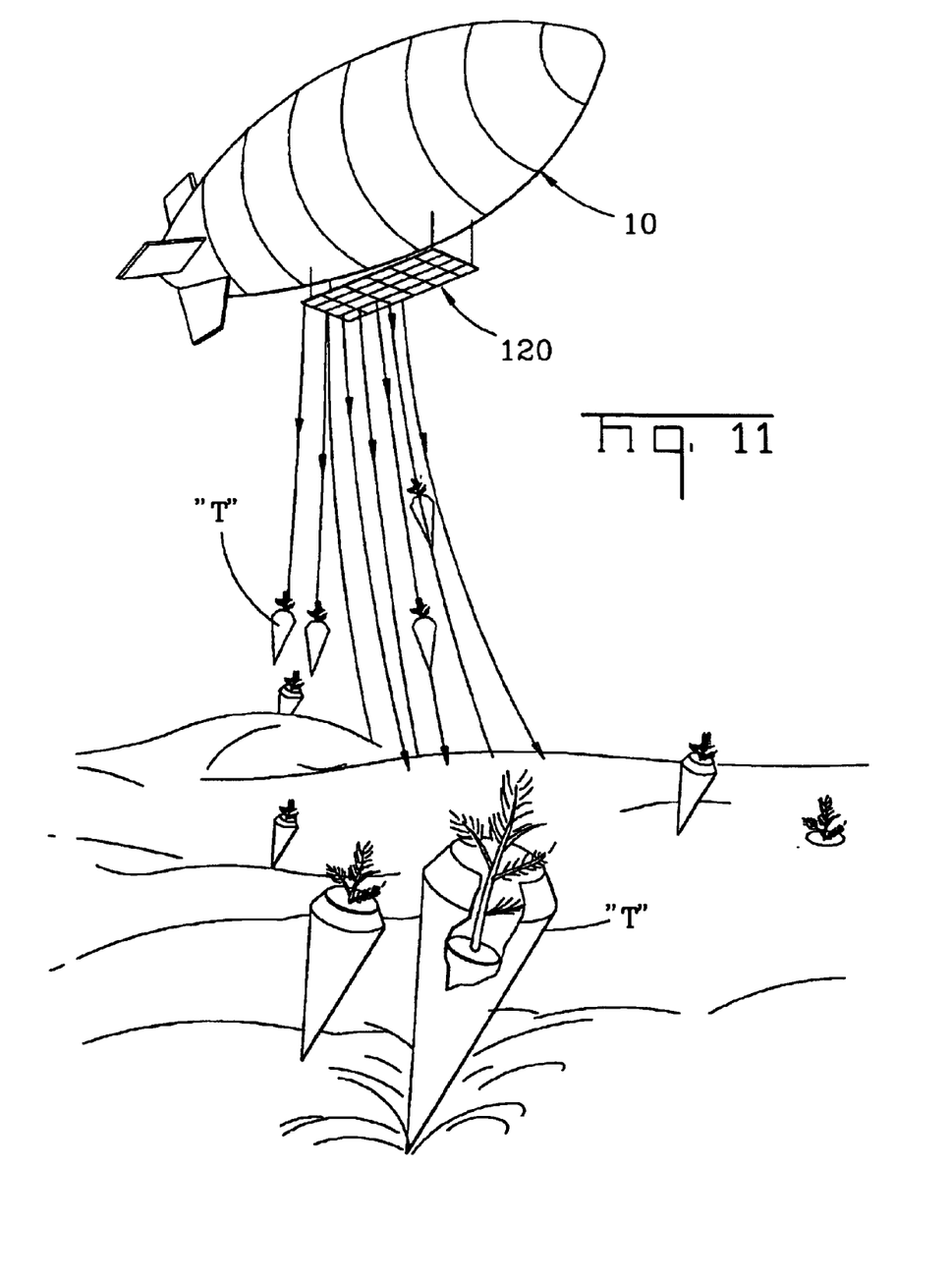
FIG. 11 is a perspective view of an alternate use for the lighter-than-air vehicle, such as carpet seeding of seedlings to remote and generally inaccessible areas.

While the preferred application for the systems hereof is an effective means to provide fire control, FIG. 11 illustrates a new and different application. It will be understood that after a devastating fire it is critical that foliage be restored to the barren land. The process illustrated in FIG. 11 may be called 'carpet seeding'. To accomplish the process, the airship system 10, 10' may be retrofitted with a suspended or internal tree sapling rack 120 containing plural tree saplings "T" or seed pouch. The saplings, for example, as known for this process, are packed in biodegradable, aerodynamic pouches containing the requisite moisture and nutrients. When dropped from the airship system, the saplings are caused to penetrate the ground to allow the saplings to survive and grow, a particularly good and efficient system for reforestation of land.

Figure 12:
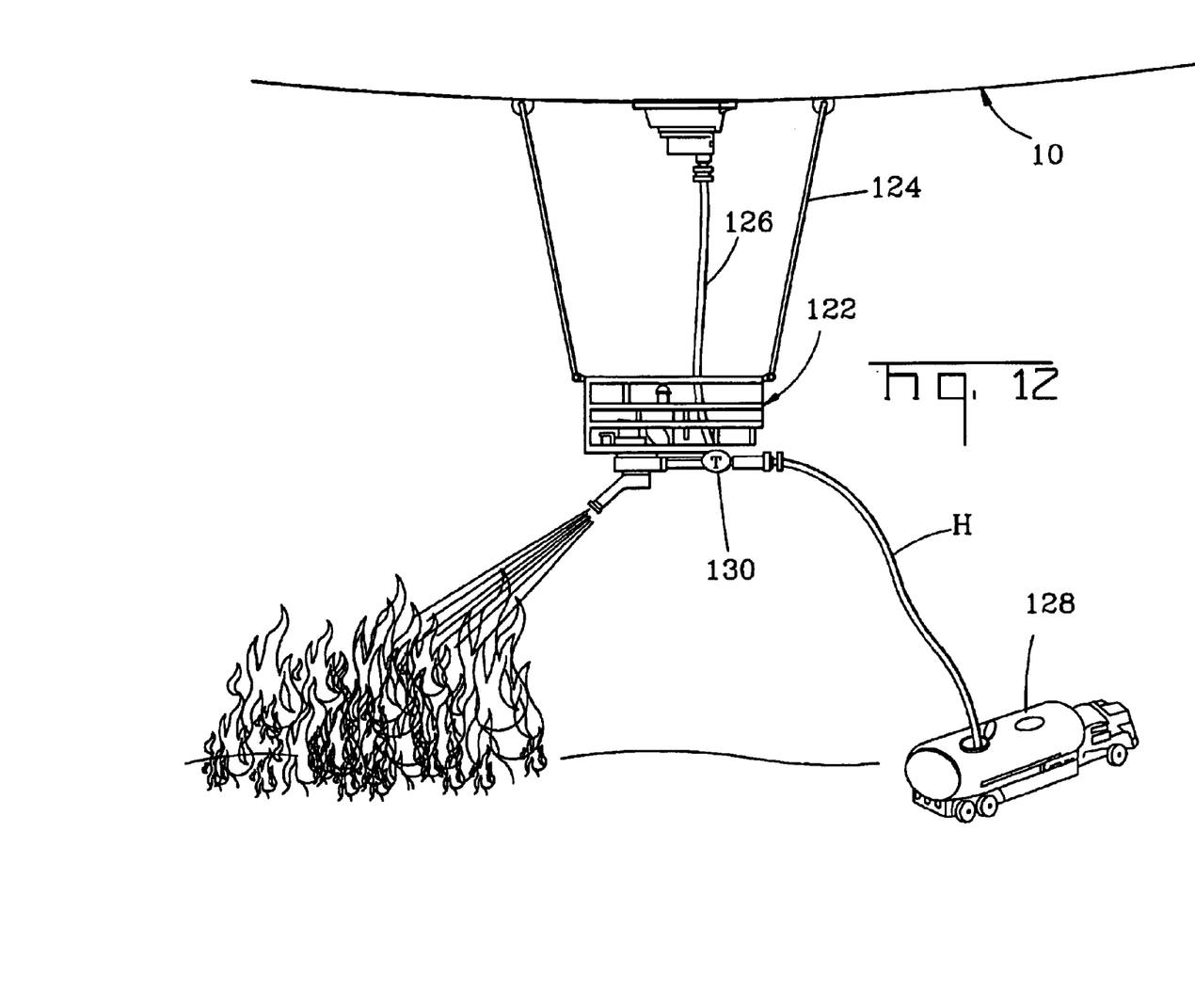
FIG. 12 is a partial perspective view of an alternate means for providing a continuous supply of water from a ground source.

FIG. 12 illustrates another mode of directing water to a localized fire, for example. The arrangement includes a suspended platform 122, such as made of aluminum, by cables 124, to receive an operator for manually directing liquid to the selected site. There may be alternate or cumulative supplies of water, namely gravity feed from the airship system via hose 126, or water supplied from a ground based tanker 128 via hose 'H'. The water distribution arrangement may include a transfer valve 130 to select the desired source of water or other liquid dispersing medium.

Figure 13A:
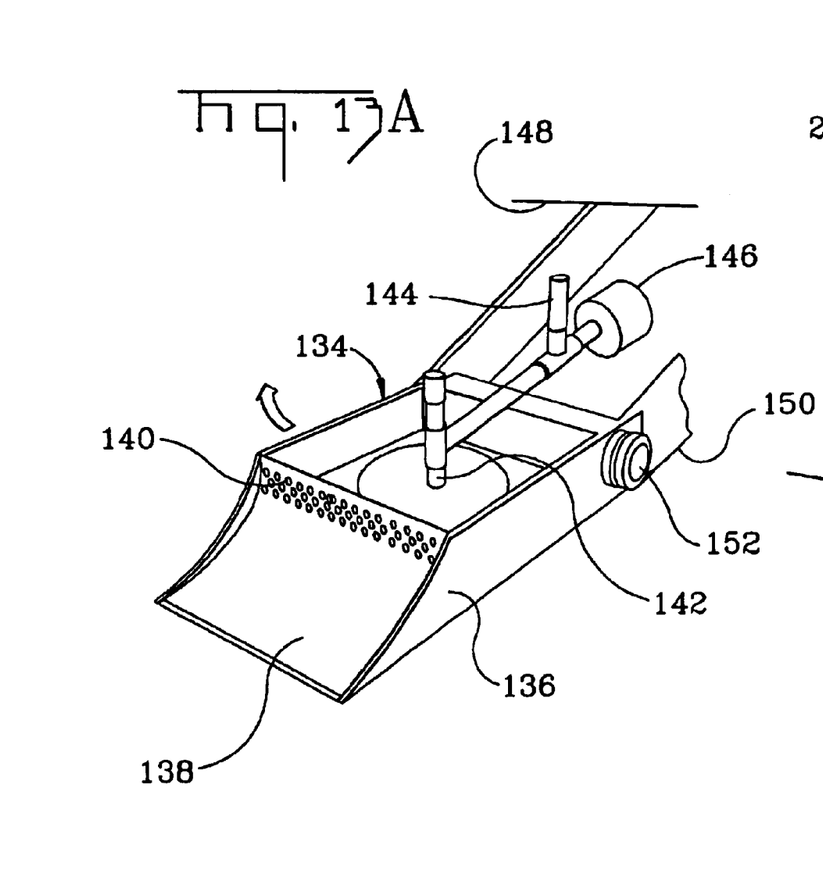
FIG. 13A is an enlarged, partial perspective view of the scoop arrangement shown in FIG. 13.
Figure 14:
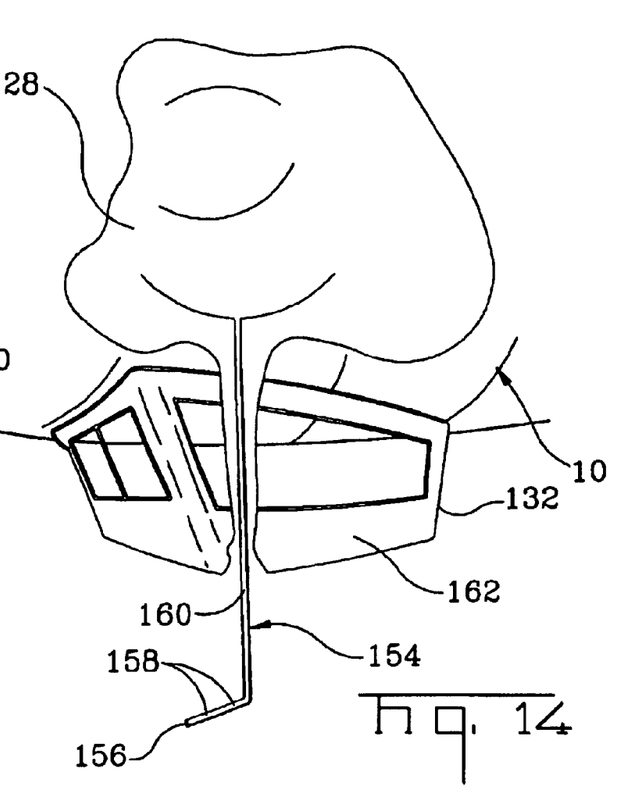
FIG. 14 is an enlarged, partial perspective view of an alternate method of filling the water tank for the system of this invention, where the alternate method is a downwardly extending snorkel for insertion below the surface of a body of water.
Figure 17:
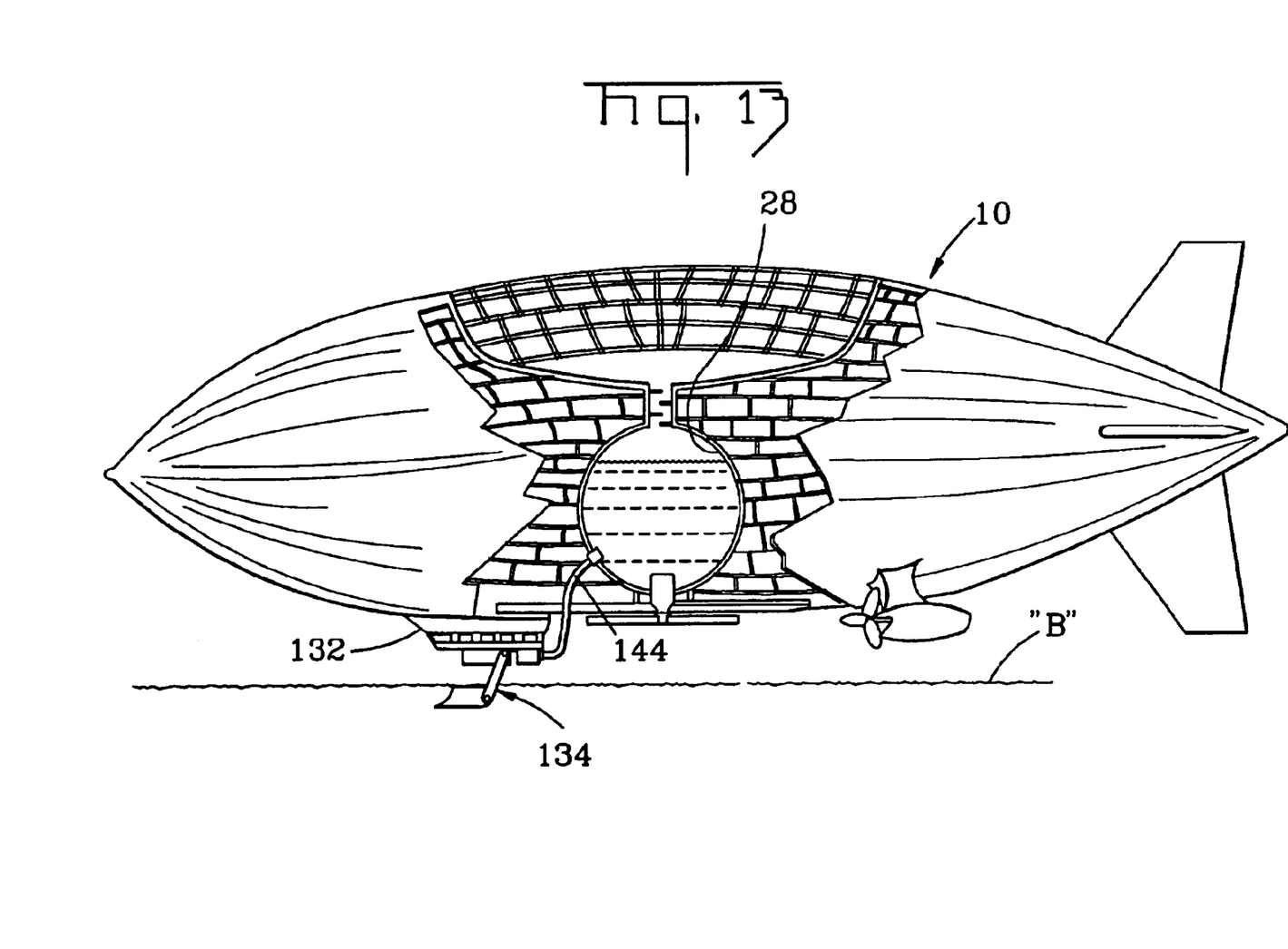

FIGS. 13, 13A and 14 illustrate further alternate means for filling the holding tank 28, especially for initialing filling of the holding tank before embarking on the assigned task. FIG. 13 illustrates, partially in section, a lighter-than-air airship 10 comparable to that described above, but showing a lower pilot's house 132 for easy access when moored, and a scoop arrangement 134 for picking up water from a pond or lake, for example, as a quick means to initially fill the water holding tank 28 before moving to a fire scene, for instance. FIG. 13A shows details of the preferred scoop arrangement 134. The scoop arrangement comprises a holding tank 136, a water pickup opening 138, and a grid guard 140.

Within the holding tank 136 is a first sump pump 142 in water communication with the holding tank 28 (not shown) via hose 144. To supplement the pumping of water from the body of water "B" (FIG. 13), at least one pump 146 may be incorporated into the system. The holding tank 136 is mounted to the underframe 148 by a pair of arms 150, where the holding tank 136 may be pivoted upwardly relative thereto about the axle 152 when not in use.

A final modification of the lighter-than-air airship of this invention is illustrated in FIG. 14. A an alternative to the scoop arrangement of FIGS. 13 and 13A may be a downwardly extending snorkel 154. The snorkel includes a distal end 156 having an allay of openings 158 to allow for the transmission of water from the body of water "B", a vertically oriented pipe 160 for bringing the water to the holding tank 28, and a pump or pumps 162. Either the scoop arrangement or snorkel are convenient methods of extracting water from a pond or lake. Though not illustrated in FIGS. 13, 13A and 14, the airship system hereof may be provided with a cannon for discharging liquid at pinpoint accuracy, rather than the broad distribution mechanism described above.

It is recognized that variations, changes and modifications may be made to the aerodynamic design of the airship system and components of this invention without departing from the spirit and scope thereof. For example, a side opening reservoir or catch basin my be incorporated into the airship system. Accordingly, no limitation is intended to be imposed thereon except as set forth in the accompanying claims.

What is claimed is:

1. A hybrid airship, platform system for delivering and dispersing large quantities of liquid while in flight and hovering modes over specified ground areas, where dynamic lift for said airship system is derived by its aerodynamically shaped body and engine fans to provide lift in an airstream, and static lift is achieved by a non-combustible lighter-than-air gas confined therewithin, said airship system comprising:

a.) a semi rigid, light-weight frame encased within a skin and aerodynamically configured to provide lift in an air stream while in a flying and hovering modes over said specified ground areas;

b.) means for flying said airship system, where said means include a plurality of engine fans and attitude stabilizing mechanisms to provide 3-axis stability and control; and, c.) a liquid control and dispensing mechanism disposed primarily within said frame, said mechanism including,
   i.) a liquid holding tank positioned along the center of gravity of said airship system,
   ii.) a manifold in liquid communication with said holding tank, when said manifold includes means for controlling the quantity of liquid passing therethrough, and
   iii.) a liquid distribution, piping and nozzle assembly in liquid communication with said manifold, where said assembly is exposed below said frame.

2. The hybrid airship, platform system according to claim 1, wherein said means for flying includes a pilot's cabin of a size to receive operating personnel.

3. The hybrid airship, platform system according to claim 1, wherein said liquid distribution, piping and nozzle assembly is mounted within a supporting frame assembly secured to the underside of said airship system.

4. The hybrid airship, platform system according to claim 1, wherein said manifold includes plural, parallel transmitting conduits, with each said parallel conduit includes means for regulating liquid flow therethrough.

5. The hybrid airship, platform system according to claim 1, including a plenum below said system, where said plenum forms a part of said liquid distribution, piping and nozzle assembly.

6. The hybrid airship, platform system according to claim 1, where said light weight material is selected from the group consisting of aluminum and carbon fiber.

7. The hybrid airship, platform system according to claim 1, wherein means are provided to replenish the liquid in said liquid holding tank, said means including a downwardly extending snorkel mechanism having an opened ended pipe operable to be positioned below the surface of a quantity of liquid, and a pump to facilitate the flow from said quantity of liquid to said holding tank.

8. A hybrid airship, platform system, for delivering and dispensing large quantities of liquid while in flight and hovering modes over specified ground areas, where lift for said airship system is achieved in part by helium confined therewithin, said hybrid airship platform system comprising:

a.) a semi-rigid, light-weight frame encased within a skin and aerodynamically configured to provide lift in an air stream while in flying and hovering modes over said specified ground areas;

b.) means for flying said airship system, where said means include a plurality of engine fans and attitude stabilizing mechanisms to provide 3-axis stability and control; and c.) a liquid control and dispensing mechanism disposed primarily within said frame, said mechanism including,
   i.) a liquid holding tank positioned along the center of gravity of said airship system,
   ii.) a manifold in liquid communication with said holding tank, where said manifold includes means for controlling the quantity of liquid passing therethrough, and
   iii.) a liquid distribution, piping nozzle assembly in liquid communication with said manifold, where said assembly is exposed below said frame;

wherein said liquid control dispensing means further includes a reservoir, open to the exterior of said airship system, for receiving in-fight replenishing of liquid, to feed liquid to said holding tank.

9. The hybrid airship, platform system according to claim 8, including a liquid passing conduit extending between said reservoir and said holding tank, and said conduit includes a series of baffle elements to minimize turbulence in the liquid passing therethrough.

10. The hybrid airship, platform system according to claim 9, including a first debris collecting filtering screen within said reservoir, a second filtering screen between said reservoir and said liquid passing conduit, and a third filtering screen between said holding tank and said manifold.

11. The hybrid airship, platforms system according to claim 8, wherein said reservoir is defined by an opening and a predetermined depth, and said opening includes a criss-cross grating member.

* * * * *